United States Patent [19]

Yamamoto

[11] Patent Number: 5,245,944
[45] Date of Patent: Sep. 21, 1993

[54] SCALE INDICATION DEVICE FOR ELECTRONIC COMPONENTS

[75] Inventor: Hiroyuki Yamamoto, Kyoto, Japan

[73] Assignee: Omron Corporation, Kyoto, Japan

[21] Appl. No.: 858,996

[22] Filed: Mar. 30, 1992

[30] Foreign Application Priority Data

Mar. 30, 1991 [JP] Japan ................................ 3-67354

[51] Int. Cl.⁵ .......................................... G01D 13/16
[52] U.S. Cl. ..................... 116/334; 116/DIG. 47;
116/308; 116/298; 116/284
[58] Field of Search ............... 116/255, 284, 292, 298,
116/302, 306, 308, 309, 334, DIG. 3, DIG. 46,
DIG. 47, 62.2; 33/DIG. 8; 368/228, 232

[56] References Cited

U.S. PATENT DOCUMENTS

| 1,362,842 | 12/1920 | Brown | 116/298 |
| 1,427,760 | 8/1922 | Ridge | 116/298 X |
| 2,004,724 | 6/1935 | Herzog | 116/298 X |
| 2,361,563 | 10/1944 | Pellaton | 368/228 X |
| 2,842,091 | 7/1958 | Kennedy | 116/292 |
| 3,092,072 | 6/1963 | Strimel | 116/334 |
| 3,434,453 | 3/1969 | Felgner | 116/292 X |
| 3,707,676 | 12/1972 | De Bretagne et al. | 116/292 X |
| 4,213,089 | 7/1980 | Liebermann | 116/292 X |
| 4,974,217 | 11/1990 | Inoue | 116/308 X |
| 5,077,708 | 12/1991 | Schneider | 368/228 X |

FOREIGN PATENT DOCUMENTS

| 1197815 | 7/1965 | Fed. Rep. of Germany | 368/232 |
| 2218954 | 11/1973 | Fed. Rep. of Germany | 368/232 |
| 2942443 | 4/1981 | Fed. Rep. of Germany . | |
| 63-10819 | 1/1988 | Japan . | |
| 2148557 | 5/1985 | United Kingdom . | |

Primary Examiner—William A. Cuchlinski, Jr.
Assistant Examiner—John L. Beres
Attorney, Agent, or Firm—Fish & Richardson

[57] ABSTRACT

A scale indication device includes a character plate having sets of characters printed on a front side thereof such that each set of characters has characters disposed about an eccentric circle having a predetermined radius. A scale plate is disposed adjacent the character plate. The scale plate has a window corresponding to each of the sets of characters such that only one of the characters in each set may be viewed through the window at a time. An eccentric rotation device is mounted on a gearbox and rotates the character plate such that different ones of the characters in each set may be viewed through the window. The rotation device includes a scale switching gear rotatable about an axis, a first engagement device formed on the scale switching gear at a distance from the axis equal to the predetermined radius, and a second engagement device formed on the character plate for rotatably engaging the first engagement device.

5 Claims, 5 Drawing Sheets

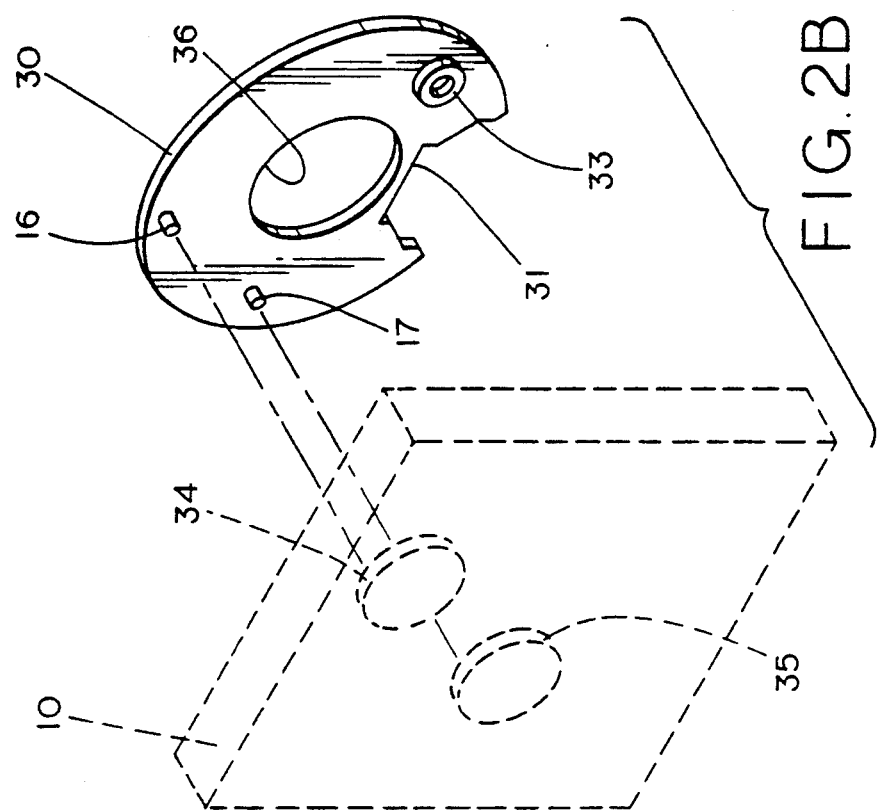
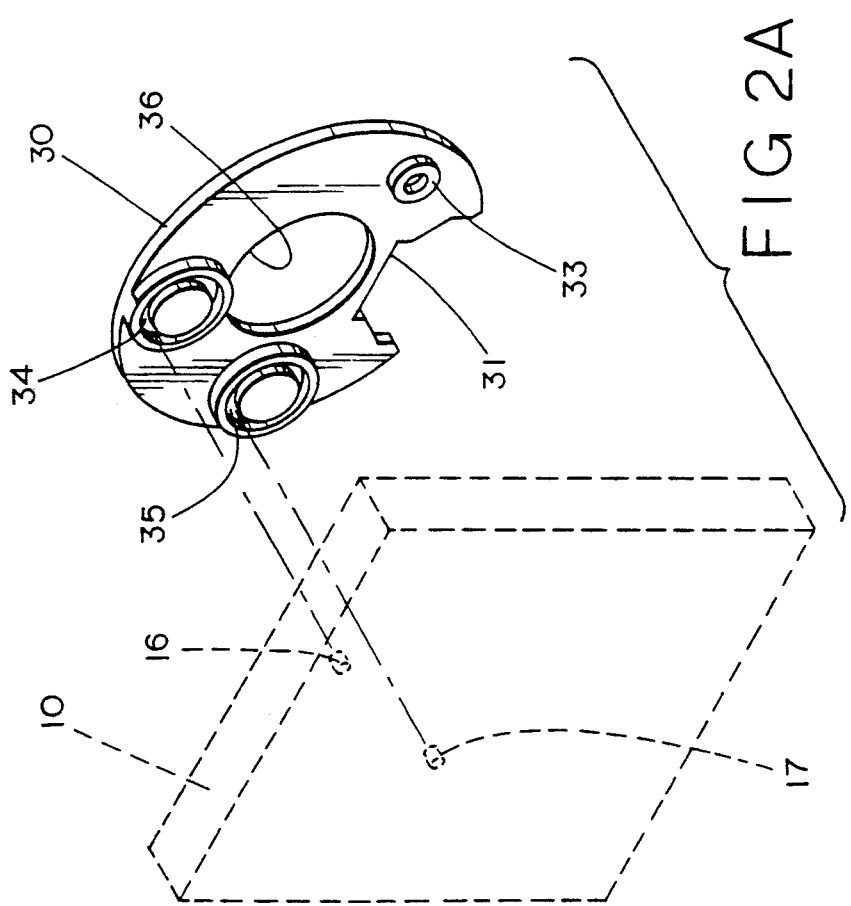

SCALE INDICATION DEVICE FOR ELECTRONIC COMPONENTS

BACKGROUND OF THE INVENTION

This invention relates to a scale indication device for electronic components. More particularly, the invention relates to a driving mechanism and a character plate for changing the indicated scale on a meter of an electronic component such as a timer.

Examples of existing scale indication devices are found in the Japanese Official Bulletin for utility model (Kokai kooho) No. Heisei 2-7838, and the Japanese Bulletin for patent (Kokai kokho) No. Showa 63-10819.

The device described in 2-7838 is illustrated in prior art FIGS. 7 and 8. As shown therein, six sets of numerals 2 for time display, each consisting of four numerals, are printed on one side of display gear 1, which consists of a doughnut-shaped plate. The display gear 1 is rotatable about its axis, which is also the axis of dial 8, by gear 3. This causes the time display numerals 2 to appear sequentially in display window 6a, which is one of the display windows 6 in scale panel 5 on the face of timer 4. For example, the numerals might appear in the sequence "8," "4," "0.8," "0.4." In other words, the rotation of gear 1 causes the numerals on the scale to change. Gear 7 is the input gear which causes display gear 1 to rotate.

In the existing timer described above, every part of the aforementioned display gear I rotates concentrically around the shaft of dial 8. As a result, all the time display numerals 2 must be printed on a single circumference of a circle with the shaft at its center. Thus if the exterior dimensions of timer 4 are fixed, the time display numerals 2 will necessarily be small, and the numerals on the scale will be difficult to read.

Furthermore, in order that the time display numerals 2 correspond perfectly to each of the display windows 6 on scale plate 5, they must be printed at a slight inclination which matches the angle of rotation of display gear 1. This requires a large amount of time and labor in the design phase and in quality control since it necessitates a high degree of accuracy in the printing of the time display numerals 2.

The device described in 63-10819 overcomes the problem of size and inclination of the characters by using an extremely complex gear system to move the character plate in a non-concentric fashion. In addition to increasing the cost due to the large number of parts, the 63-10819 device requires "two-sided" assembly (i.e., the gear system requires assembly from both the front and the rear), thus requiring that the device be fully assembled prior to connection to other components. This is a disadvantage as it may be desirable to assemble the scale indication device from only the front side after the back portion has been attached, for instance, to a circuit board.

SUMMARY OF THE INVENTION

The invention overcomes the above disadvantages of the prior art by providing a scale indication device which requires few moving parts and which is easy to assemble. According to one embodiment, the device of the invention comprises a character plate having a plurality of sets of characters printed on a front side thereof, each said set of characters comprising a plurality of characters arranged about an eccentric circle having a predetermined radius; a scale plate disposed adjacent said character plate, said scale plate having a window corresponding to each of said plurality of sets of characters such that only one of said characters in each set may be viewed through the window at a time; and eccentric rotation means mounted on a gearbox for rotating said character plate such that different ones of said characters in each set may be viewed through the window, said means comprising: a scale switching gear rotatable about an axis, first engagement means formed on the scale switching gear at a distance from the axis equal to the predetermined radius, and second engagement means formed on the character plate for rotatably engaging said first engagement means.

The gear mechanism of the preferred embodiment is constructed in the following way. It has, either on the scale switching gear in the gear mechanism or on the back side of the numbered plate, a small projection which is eccentric by a specified distance with respect to the rotating shaft of the scale switching gear. It has a small hole to engage this projection on the plate or gear, whichever is opposite to the projection, which hole can rotate around the said eccentric projection. Further it has, either on the front side of the gearbox which faces the numbered plate or on the back side of the plate which faces the gearbox, annular guides with radii equal to the distance by which the aforesaid eccentric projection is off center. It has, on the opposing surface, a number of projections which engage in the aforesaid annular guides in such a way as to be constrained in motion by them. It has several sets of numbers inscribed on the front side of the numbered plate for time display. These numbers, which are provided along the circumference of a circle whose radius is equal to the eccentricity of the aforesaid eccentric projection, correspond to the position of the aforementioned display windows.

With this invention, a scale switching gear is made to rotate as the scale is being set. When this occurs, every part of a numbered plate which is interlocked with this scale switching gear rotates eccentrically describing an arc of a circle whose radius is equal to the eccentricity of the eccentric projection.

BRIEF DESCRIPTION OF THE DRAWINGS

FIG. 2A is an exploded oblique view of the numbered plate as seen from the back according to a first embodiment;

FIG. 2B is an exploded oblique view of the numbered plate as seen from the back according to a second embodiment;

DETAILED DESCRIPTION OF THE INVENTION

A preferred embodiment of the invention will now be described with reference to the figures. The figures show the invention embodied in a timer, but the invention is not so limited.

Figure 1:
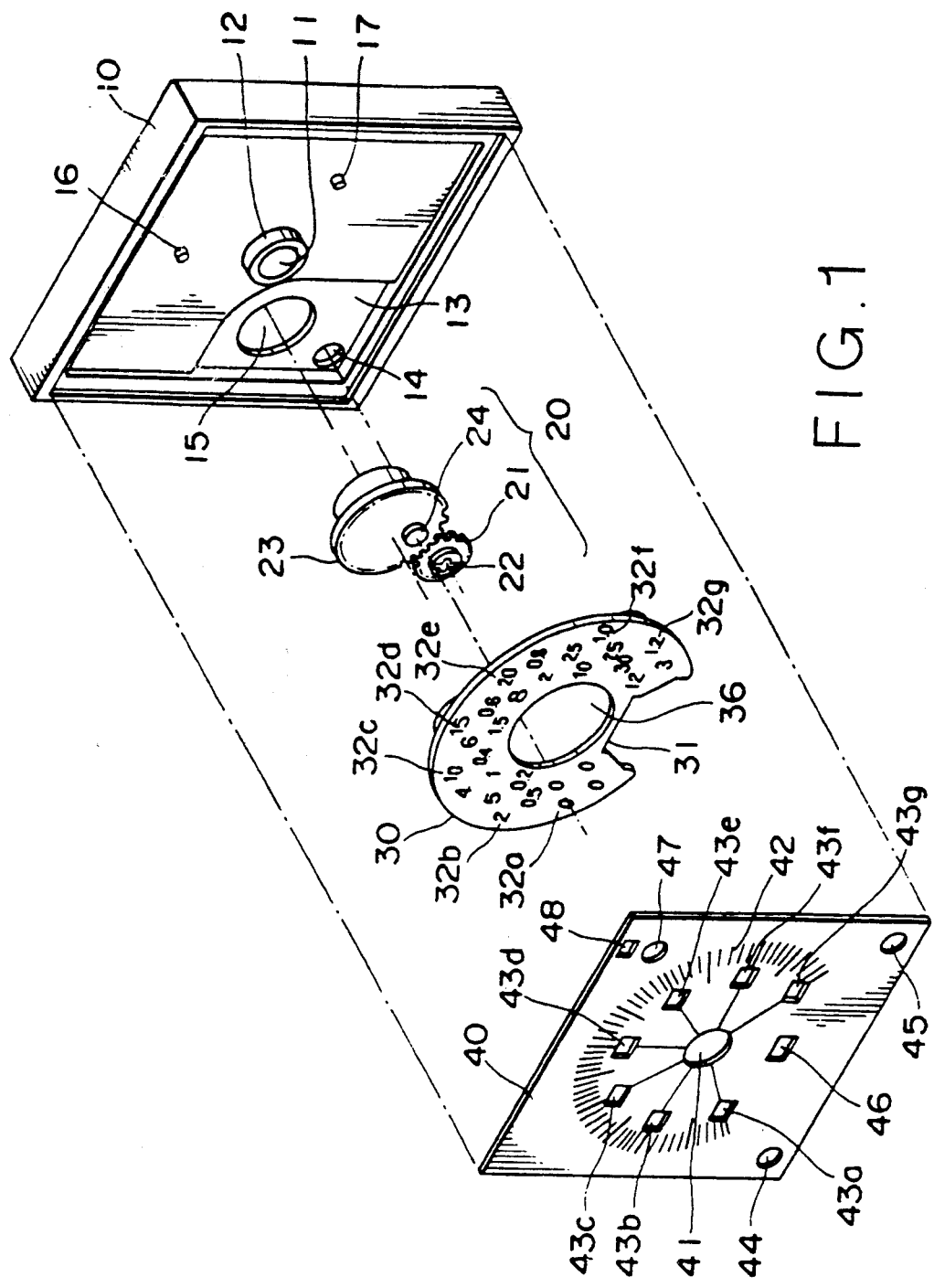
FIG. 1 is an exploded oblique view of an embodiment of the time-setting device for a timer related to this invention.

As shown in FIG. 1, the indicator device includes a gearbox 10, a gear mechanism 20, numbered plate 30, and scale plate 40.

Figure 3:
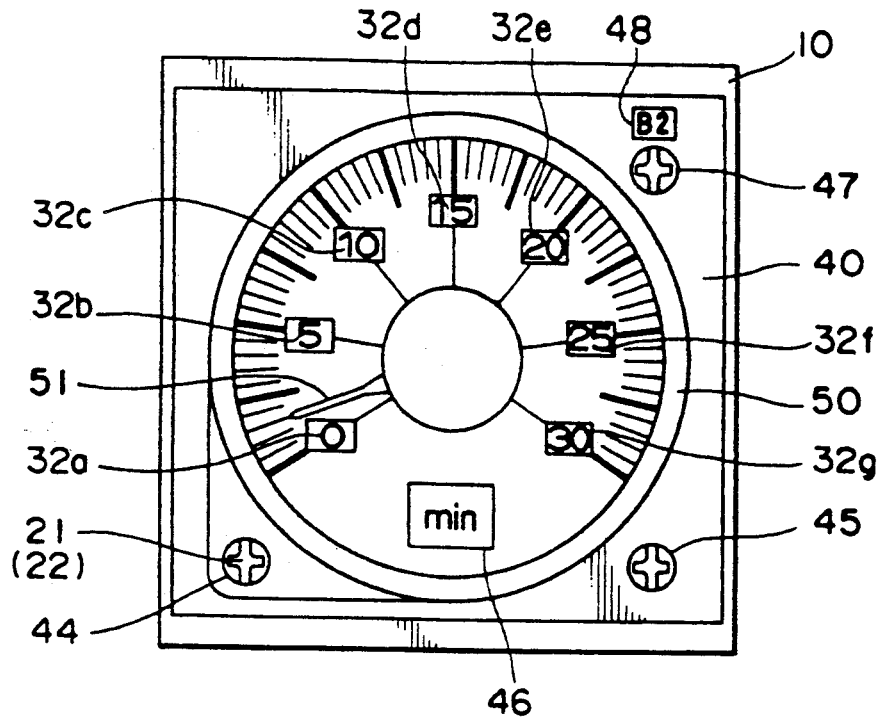
FIG. 3 is a frontal view of an embodiment of the time-setting device for a timer related to this invention.

In the center of gearbox 10 is a cylindrical projection 12. In the center of this projection is a hole 11, into which a shaft (not pictured) of dial 50 (FIG. 3) is inserted. In the cutaway segment 13 at the corner of gearbox 10 are insertion holes 14 and 15, into which an input gear 21 (to be described below) and scale switching gear 23 are rotatably fitted. Two guide pins 16 and 17 are provided in the appropriate places. The indicator needle 51 shown in FIG. 3 is joined to dial 50 and rotates along with it.

Gear mechanism 20 comprises input gear 21 and scale switching gear 23. On the projecting surface of input gear 21 is a slot 22, into which a screwdriver can be inserted to rotate the gear. Input gear 21 is fitted into insertion hole 14 on gearbox 10 so as to be able to rotate.

Figure 5:
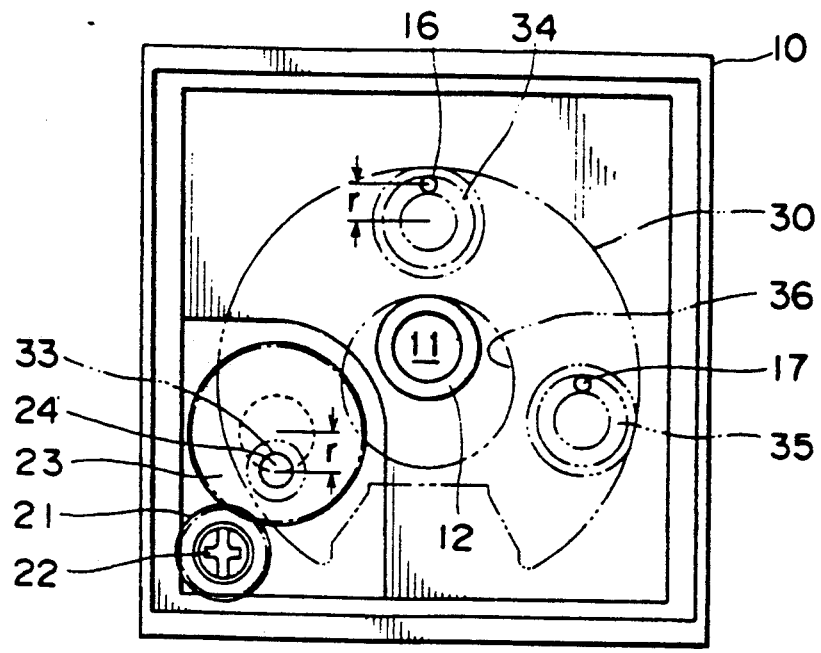
FIG. 5 explains the operation of the time-setting device for a timer related to this invention.

Scale switching gear 23 rotates as a result of being meshed with the input gear 21. The contactor on the lower surface of gear 23 makes contact with the scale-setting pattern in order to switch the scale of the limit time. Eccentric projection 24, which is made with the gear as a single piece, is eccentric with respect to the axis of rotation by a distance r (see FIG. 5). Scale switching gear 23 fits into hole 15 in the gearbox 10 so as to be able to rotate.

Figure 4:
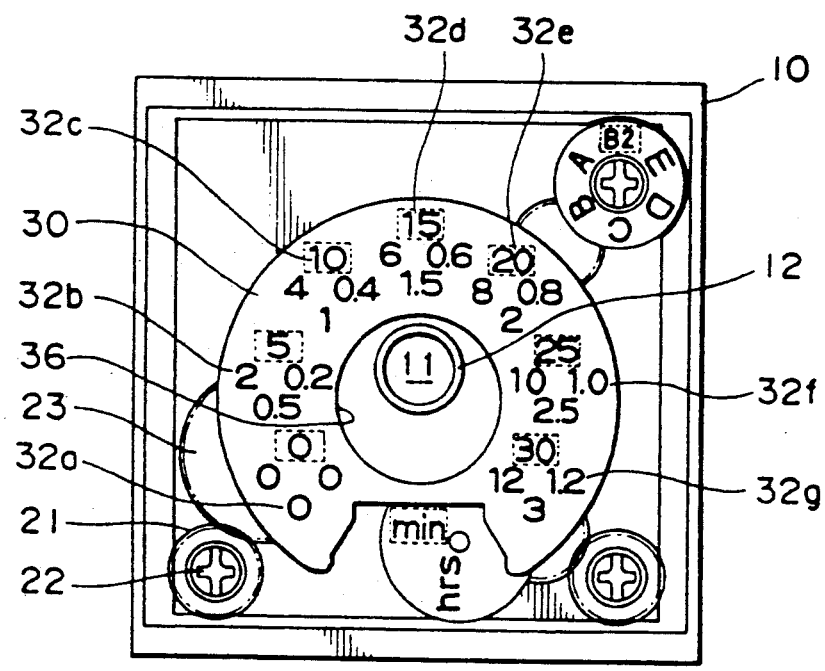
FIG. 4 is a frontal view of an embodiment of the time-setting device for a timer related to this invention, with the dial and scale plate removed.

Numbered plate 30 consists of a nearly doughnut-shaped plate with a portion 31 cut out. On the surface of plate 30 are printed seven sets of time display numerals (32a through 32g), with four numerals in each set (see FIGS. 1 and 4). Numerals 32a through 32g are arranged along the circumference of circles whose radii are equal to the eccentricity r of eccentric projection 24. As shown in FIG. 2A, there is a hole 33 on the back of numbered plate 30 into which fits eccentric projection 24 on the scale switching gear 23. Annular guides 34 and 35 are provided to engage, respectively, guidepins 16 and 17 on the gearbox 10. Alternatively, as shown in FIG. 2B, annular guides 34 and 35 may be provided on the gearbox 10 to engage guidepins 16 and 17 formed on the numbered plate 30. The radii of guides 34 and 35 are identical to eccentricity r.

Numbered plate 30 is mounted on gearbox 10, and eccentric projection 24 fits into its hole 33. When guide pins 16 and 17 engage in annular guides 34 and 35, cylindrical projection 12 on gearbox 10 fits easily into center hole 36 in numbered plate 30, and the back of numbered plate 30 and the outer surface of cylindrical projection 12 are in virtually the same plane.

Scale plate 40 is made from a virtually square plate which can be mounted on the gearbox 10. In the center of the plate is a hole 41, into which the shaft of dial 50 is inserted. Scale gradations 42 radiate from this center. Adjacent to these scale gradations 42 are provided display windows 43a through 43g, which correspond to the sets of time display numerals 32a through 32g. In one corner of scale plate 40 is adjustment hole 44, through which the input gear 21 can rotate in order to switch the time display numerals (4 modes in this embodiment).

With reference to FIG. 1, 45 indicates the adjustment hole to switch the time scale; 46 indicates the display window for time increments; 47 is the adjustment hole to switch operating modes; and 48 is the display window for operating mode.

Figure 6:
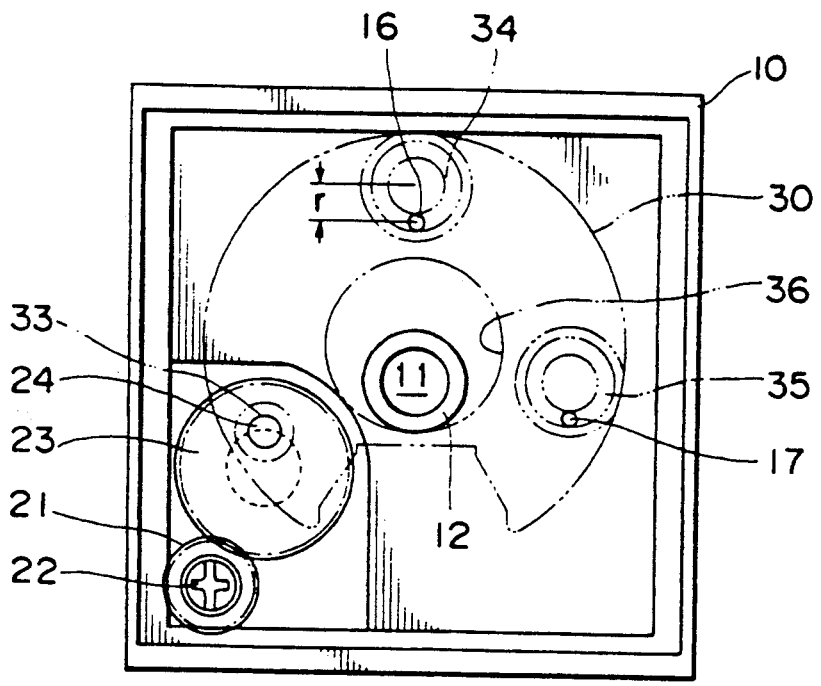
FIG. 6 explains the operation of the time-setting device for a timer related to this invention.
Figure 7:
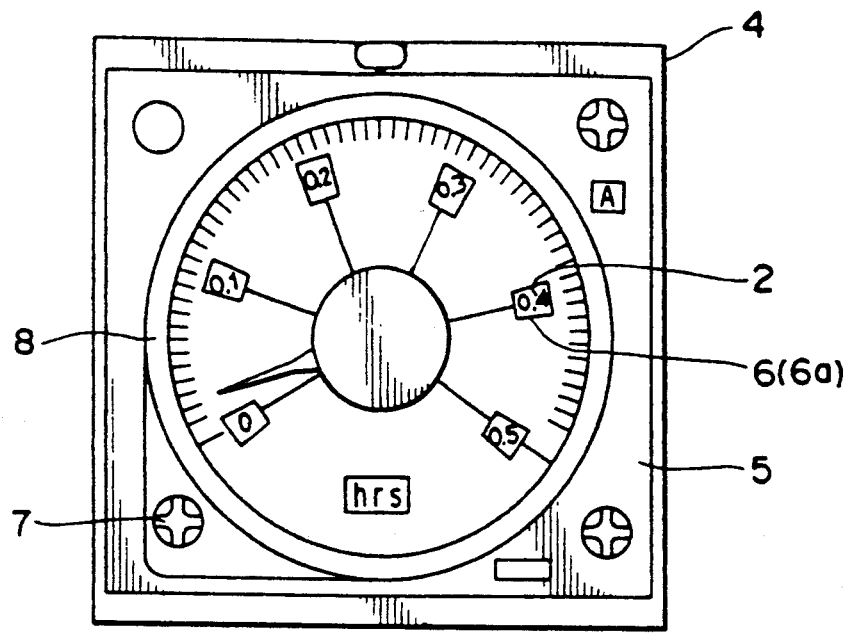
FIG. 7 is a frontal view of an example of an existing timer.
Figure 8:
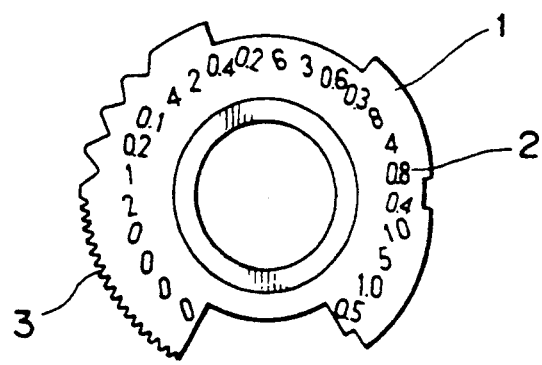
FIG. 8 is a frontal view of the display gear of an example of an existing timer.

In operation, when it is desired the change the indicates scale input gear 21 is made to rotate over a specified angle by the turn of a screwdriver inserted through adjustment hole 44 on scale plate 40 into slot 22 on input gear 21. This causes scale switching gear 23, which is meshed with the input gear, also to rotate. Eccentric projection 24 on scale switching gear 23 rotates describing an arc of a circle with radius r whose center is the shaft of scale switching gear 23 (shown by the dotted line in FIGS. 5 and 6). Annular guides 34 and 35 on back side numbered plate 30 engage with guide pins 16 and 17 on front side of gearbox 10 in such a way that the pins can make contact with the guides. The eccentric projection 24 is fitted into hole 33 on numbered plate 30 in such a way as to be able to rotate. As a result, every part of numbered plate 30, guided by these guides and pins, rotates eccentrically, describing an arc of a circle with radius r equal to the eccentricity.

When input gear 21 rotates over a specified angle, each set of time display numerals 32a through 32g rotates eccentrically, and the numerals are exposed, one at a time, through display windows 43a through 43g. In this way the numerals for the scale gradations are changed.

The scale indication device of the invention requires a small number of components and can be easily assembled. In addition, as input gear 21 and scale switching gear 23 are mounted on gearbox 10 from the front, the device can be assembled even when the back of the gearbox is already mounted to an electrical component. Furthermore, due to the reduced number of parts the depth necessary for the device is decreased, thus resulting in a low-profile package. Moreover, as the total number of moving parts is small, the total frictional force is reduced and thus the scale can be changed without effort.

The invention is not limited to the above-described embodiment. For instance, at least two annular guides should be provided on either the gearbox or the numbered plate, but three would also be acceptable. The guide pins may alternatively be provided on the numbered plate and the annular guides on the gearbox. Likewise, the eccentric projection need not be provided on the scale switching gear; instead, a hole which is eccentric with respect to the axis of rotation may be provided on the scale switching gear, with the projection which engages the said hole in such a way as to be able to rotate provided on the numbered plate.

What is claimed is:

1. A scale indication device, comprising:
 a character plate having a plurality of sets of characters printed on a front side thereof, each said set of characters comprising a plurality of characters arranged about an eccentric circle having a predetermined radius;
 a scale plate disposed adjacent said character plate, said scale plate having a window corresponding to each of said plurality of sets of characters such that only one of said characters in each set may be viewed through the window at a time; and
 eccentric rotation means mounted on a gearbox for rotating said character plate such that different ones of said characters in each set may be viewed through the window, said means comprising:

a scale switching gear rotatable about an axis, first engagement means formed on the scale switching gear at a distance from the axis equal to the predetermined radius, and second engagement means formed on the character plate for rotatably engaging said first engagement means.

2. A scale indication device as claimed in claim 1, wherein said first engagement means comprises a projection and said second engagement means comprises a recess formed in the character plate.

3. A scale indication device as claimed in claim 1, further comprising guide means for guiding rotation of said character plate, said guide means comprising an annular guide formed on said character plate and a projection formed on the gearbox so as to communicate with said annular guide.

4. A scale indication device as claimed in claim 1, further comprising guide means for guiding rotation of said character plate, said guide means comprising an annular guide formed on said gearbox and a projection formed on the character plate so as to communicate with said annular guide.

5. A scale indication device as claimed in claim 1, further comprising an input gear which engages said scale switching gear.

* * * * *